(No Model.) 4 Sheets—Sheet 1.

J. L. LAUGHLIN.
ROTARY CULTIVATOR.

No. 323,164. Patented July 28, 1885.

ATTEST.
J. Henry Kaiser.
Jacob Felbel.

INVENTOR.
John L. Laughlin
by J. N. McIntire
Atty.

(No Model.) 4 Sheets—Sheet 3.

J. L. LAUGHLIN.
ROTARY CULTIVATOR.

No. 323,164. Patented July 28, 1885.

ATTEST:
J. Henry Kaiser.
Jacob Felbel.

INVENTOR.
John L. Laughlin
by J. N. McIntire
Atty.

(No Model.) 4 Sheets—Sheet 4.

J. L. LAUGHLIN.
ROTARY CULTIVATOR.

No. 323,164. Patented July 28, 1885.

ATTEST—
J. Henry Kaiser.
Jacob Felbel.

INVENTOR—
John L. Laughlin
by S. N. McIntire
Atty.

N. PETERS, Photo-Lithographer, Washington, D. C.

UNITED STATES PATENT OFFICE.

JOHN L. LAUGHLIN, OF LOUISVILLE, KENTUCKY, ASSIGNOR TO B. F. AVERY & SONS, OF SAME PLACE.

ROTARY CULTIVATOR.

SPECIFICATION forming part of Letters Patent No. 323,164, dated July 28, 1885.

Application filed March 30, 1885. (No model.)

*To all whom it may concern:*

Be it known that I, JOHN L. LAUGHLIN, of Louisville, in the county of Jefferson and State of Kentucky, have invented certain new and useful Improvements in Rotary Cultivators; and I do hereby declare that the following is a full, clear, and exact description thereof, reference being had to the accompanying drawings, making part of this application.

My invention relates to a machine adapted to the cultivation of sugar-cane.

In the sugar-cane districts of the South it is the practice in planting cane to cut trenches or furrows, in which the "plant-cane" is laid in pieces varying from three to six feet in length, and so as to overlap endwise, which are subsequently covered up with the dirt which was removed in forming the ditches or furrows. When the cane begins to come up, its growth is somewhat impeded by the growth of grass and weeds surrounding it, and in order to obviate the choking of the plants by weeds it is the practice, at certain seasons of the year, to pile up the earth around and against the roots of the young growing cane, thus covering over the weeds.

My invention has for its main object the production of a sugar-cane-cultivating machine which shall be capable of use both for the purpose of filling up the ditches within which the cane has been planted, and for throwing up the earth around the growing cane and over surrounding and intermediate grass and weeds that tend to choke the growth of the young cane, as may be desired, and which shall at the same time not be liable in performing the latter operation to cut or otherwise injure the cane.

To this main end my invention consists in certain novel features of construction, which will be hereinafter fully explained, and more particularly pointed out in the claims.

Figure 1:
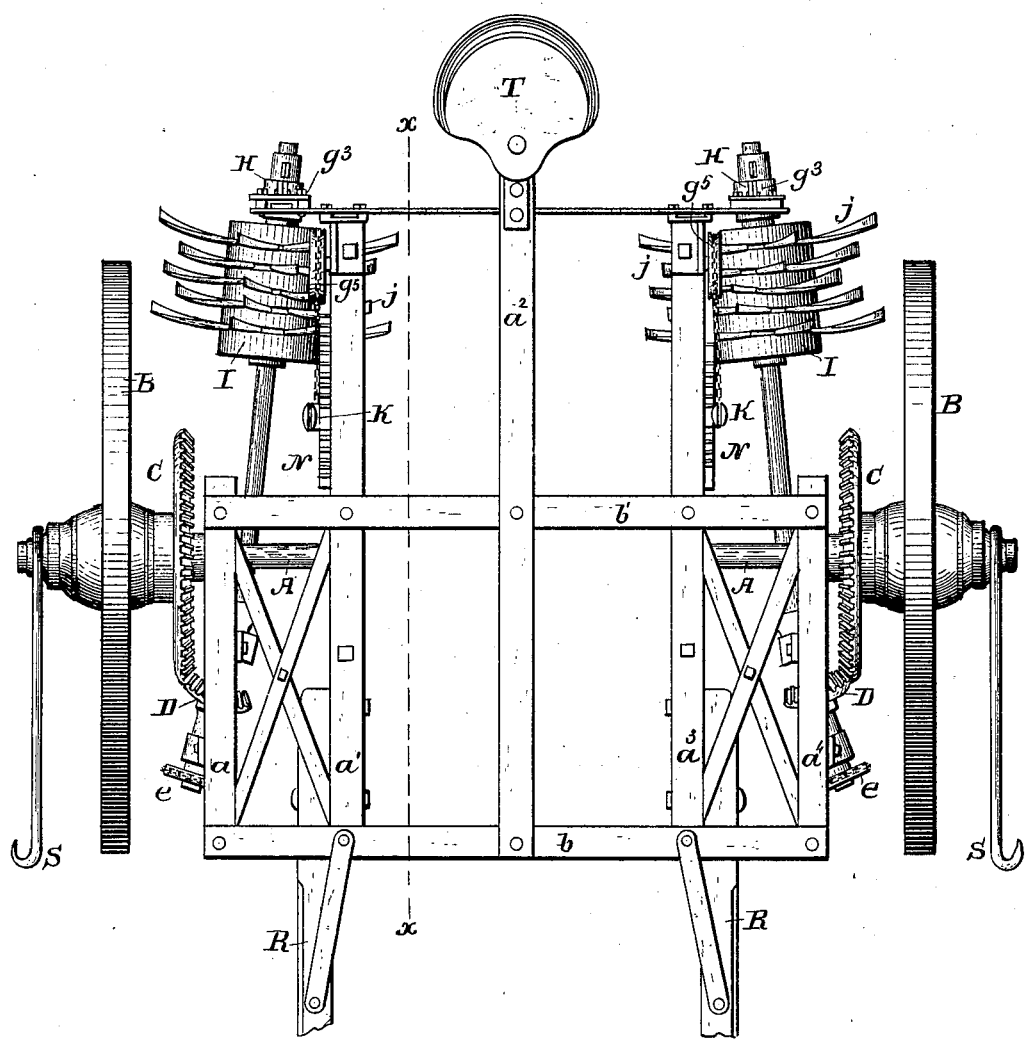
Figure 2:
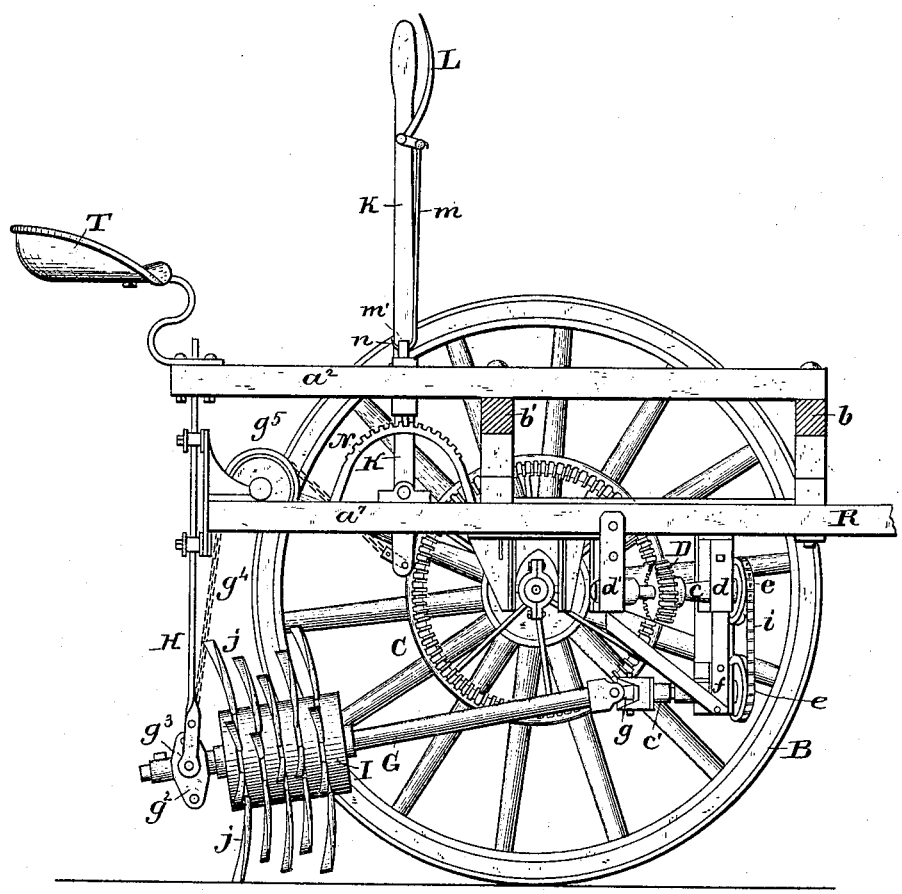
Figure 3:
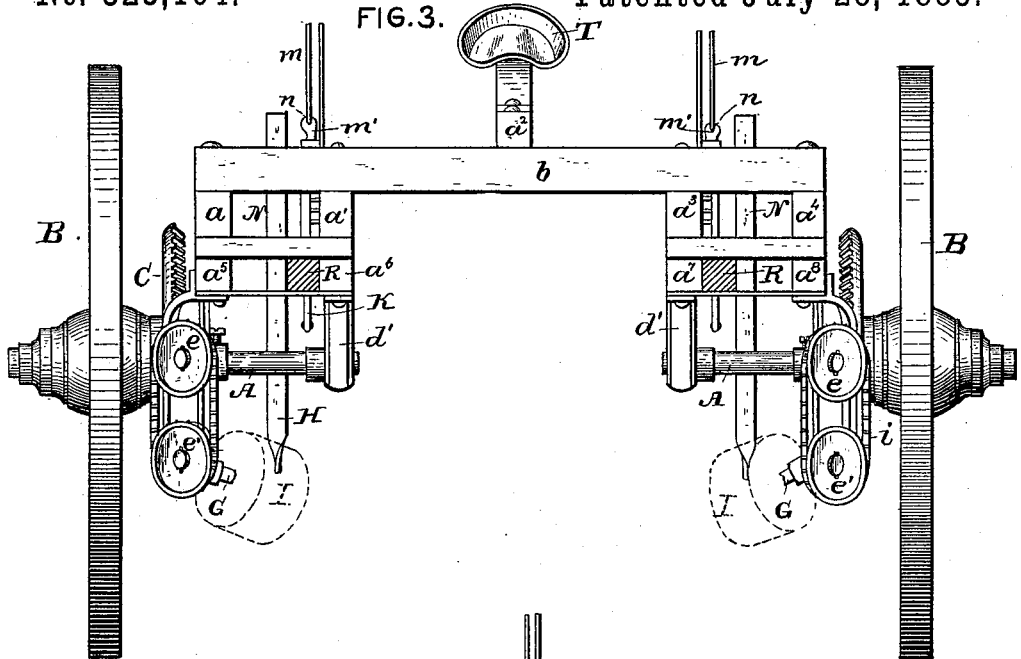
Figure 4:
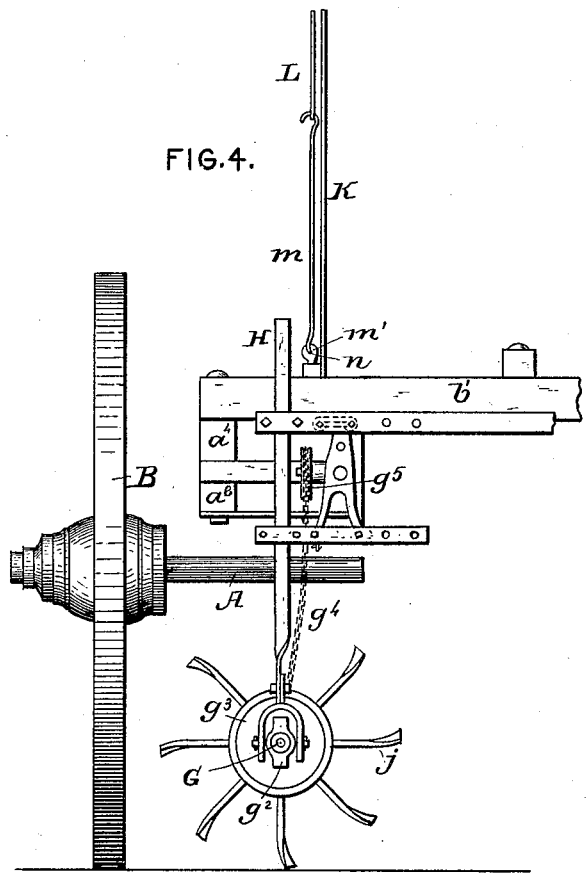
Figure 5:
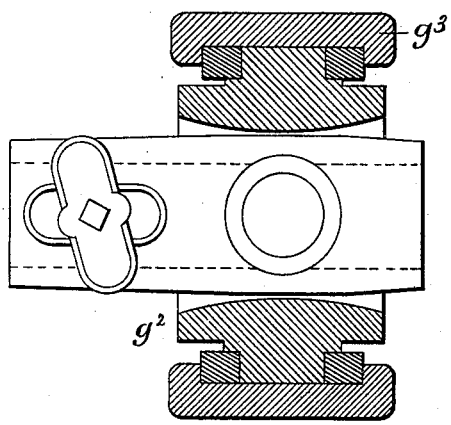
Figure 6:
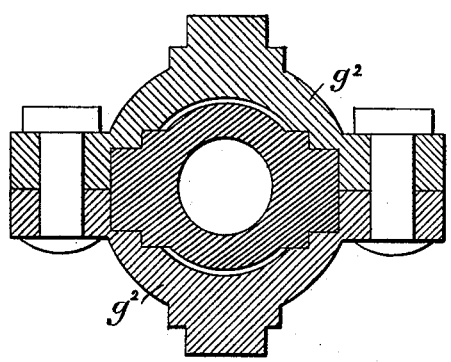
Figure 7:
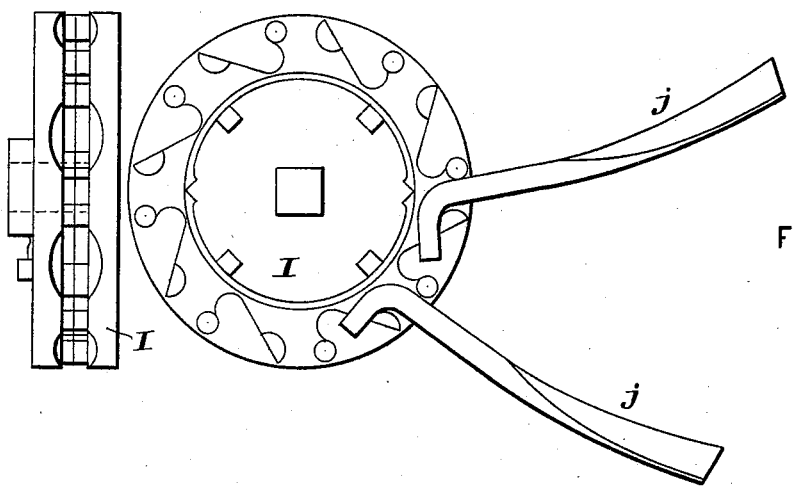
Figure 8:
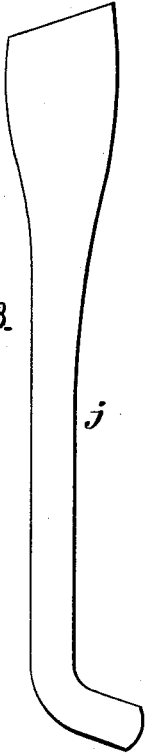
Figure 9:
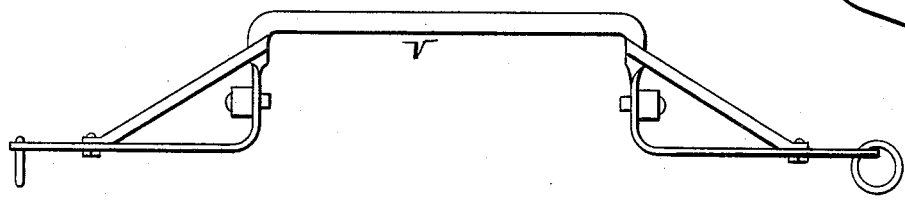

In the accompanying drawings, Figure 1 is a top view of a machine embodying my invention. Fig. 2 is a side sectional view thereof at the line *x x*, Fig. 1, and showing all the parts of cultivator in position for use. Fig. 3 is a front view of the machine. Fig. 4 is a rear view of about one-half of the machine. Fig. 5 is a detail view of the journal-box and strap. Fig. 6 is a sectional view of the same. Fig. 7 is a side and edge view of the disk or cylinder, showing two cultivator-teeth inserted. Fig. 8 is a detail view of a cultivator-tooth detached. Fig. 9 is a detail view of the neck-yoke used in my machine.

In the several views the same part will be found designated by the same letters of reference.

The main frame-work of the machine is composed of longitudinal beams $a\ a'\ a^2\ a^3\ a^4\ a^5\ a^6\ a^7\ a^8$ and the transverse beams $b\ b'$, all securely bolted together. A A are two axles suitably journaled in the main frame of the machine, and carrying at their outer ends driving and ground wheels B B.

Fast on the axles A A, near the hubs of the driving-wheels, are bevel-gears C C, which engage with bevel-pinions D D, secured to short obliquely-arranged shafts $c\ c$, that revolve in suitable bearing-boxes, $d\ d$, hung in brackets $d'\ d'$, depending from the main frame of the machine, the said shafts being provided at their front ends with chain-wheels $e\ e'$.

From the brackets $d'\ d'$ on either side of the machine hang stirrups $f f$, in the lower portion of each of which is arranged to turn freely one end of another shaft, $c'$, to the front extremity of which latter is made fast another chain-wheel, $e'$, located beneath the chain-wheel $e$, and around said chain-wheels passes a drive-chain, $i$, all as clearly shown.

To the rear end of each of the shafts $c'$ is connected, by a universal-joint coupling, $g$, the forward end of a longer shaft, G, the rear end of which revolves in a bearing-box, $g^2$, suspended by a rod, H, from the main frame of the machine, and on said shaft G, near its rear end, is securely mounted a drum or cylinder, I, that is provided with a series of cultivator-teeth, $j$, arranged radially in sets around its periphery.

To a strap or yoke, $g^3$, pivoted to the journal-box $g^2$, is secured one end of a chain, $g^4$, which chain passes upwardly over a loose pulley or idler, $g^5$, (arranged to rotate in the main frame of the machine,) and thence downward obliquely, having its other end secured to the lower end of a hand-lever, K, that is pivoted at $k$ in a box or stand secured to the main frame.

Near the handle portion of the lever K is pivoted an angle-lever, L, to the shorter arm of which is pivoted the upper end of a rod, $m$, the lower end of which is formed into a hook, $m'$, that passes through an eye in the upper portion of a spring-bolt, $n$, that engages at its lower end with the teeth of a sector, N, secured in any suitable manner to one of the longitudinal beams of the main frame.

The cultivator-teeth $k$ are preferably made detachable from the drum I, for a purpose to be hereinafter more fully explained, and at Fig. 7 will be seen a novel construction of cylinder and cultivator-teeth, by which the insertion into and withdrawal from the cylinder of the teeth $j$ may be easily accomplished.

At different localities around the periphery of the drum are openings for the accommodation of the roots of the teeth, and below its periphery are arranged cross-bars and a plate, with an opening to properly hold and support each tooth when in operation.

Each tooth is made at its outer end with a broad flattened portion, and is formed at its inner end with a bend to produce a sort of hook adapted to engage with the retaining devices of the drum 1. This drum (or tooth-cylinder) is composed of a series of disk-like plates or castings, any two of which, when placed on the shaft G and secured thereto, will confine between their adjacent sides or surfaces one set of the radially-arranged teeth $j$, but which will retain the roots of said teeth in such a manner that the working or outer ends of all the teeth will have more or less play or movement in the plane in which lies the whole set of teeth.

As the machine, when used for the cultivation of sugar-cane, will often have to pass over cane five feet in height, the middle of the frame-work must of course be more than that height, which would be too high for the location of the ordinary tongue or pole for hitching the team to. To obviate this difficulty I use two tongues, R R, that are bolted to the main frame on each side of the center of the machine and at the proper and usual elevation, as will be seen. These tongues are yoked together at their front ends by a yoke-piece, (seen at Fig. 9,) which is so constructed that its middle portion will clear the tops of the cane-stalks.

The team is hitched outside of the tongues and pulls from the outer ends of the axles, to each of which is attached a bar or rod, S, the forward end of which is formed with a hook for the attachment thereto of the whiffletree.

I propose to use my novel machine in the following manner: After the ditch has been cut, preferably by a double-nosed plow, and the soil turned to each side thereof, and the cane planted, I run the cultivator-machine over the ditch, and by the revolutions of the drums, provided with the full complement of hoes or cultivator-teeth, (thirty-two,) I throw the soil from each side into the ditch, thus covering the cane planted therein. During the early growth of the cane, and when the grass and weeds begin to grow up and around and tend to choke it, I again use the machine to throw more earth up around the roots of the cane and on top of the grass, and at this time I use only about five to eight teeth and only about two of the disks to each drum. When the cane gets a little higher, I put more teeth into more of the disks—say from twelve to fifteen—and subsequently, during the several cultivations required, (from five to six,) I increase the number of the teeth until finally the full complement of thirty-two is in.

When the soil is heavy and wet, one tooth will throw more than it will with loose dry soil, and hence the variations in the number of teeth employed will depend somewhat on the nature and also the condition of the soil, as well as on the condition of the cane. When the earth to be thrown up is hard and in clods, the front row of teeth may be shaped differently from those shown, and so as to cut; and, usually in such case, some of the rows of teeth will be taken out to leave greater spaces between the sets or rows of teeth to avoid throwing on lumps or clods.

Having described the construction of a machine embodying my invention, and some of the purposes for which I propose to use it, I will now describe more especially its mode of operation.

Supposing, now, that a double-nosed plow shall have been used to cut a ditch or furrow, and has thrown the soil in hills on each side thereof, and that the cane shall have been planted in the usual manner in said furrow. The machine, having been set to straddle the row or furrow, is pulled along by the team, and motion thus transmitted from the drive-wheels B B (through the bevel-gears A A on each driving-wheel, bevel-pinions D D, shafts $c\ c$, chain and chain-wheel connections $e\ e\ i\ i$ $e'\ e'$ to the shafts $c'\ c'$, and universal couplings $g\ g$) and thence to the obliquely-arranged shafts G G, on which are mounted the drums or cylinders I I, with their cultivator teeth or hoes $j\ j$, the latter will be revolved so as to brush or sweep up (from both sides of the row) the proper or desired quantity of earth and throw it over and into the furrow, so as to cover up the cane planted therein. In performing this work the machine is set, usually, to throw in about one-half only of the dirt. From his seat at T on the machine the driver can, by means of adjusting devices, set the rotary brushes higher or lower to throw more or less of the dirt into the cane-row, as may be desired.

The rotary brush-like toothed drums may be adjusted both laterally and vertically. If it be desired to have them throw more dirt than they could in the positions in which they are shown in the drawings, the driver will pull the hand-levers L L toward him, disengage the dogs n n from between the teeth on the racks N, (with which they now engage,) and, while the levers L L are thus pulled toward him and hold up the dogs n n out of engagement with the racks, push the upper ends of the hand-levers K K and their appendages from him, and thus allow the brushes to descend nearer the ground, the shafts G G on which they are mounted vibrating downwardly from the horizontal pins of the universal-joint couplings. When the brushes shall have descended as low as desired, the driver releases his hold upon the lever L, and the dogs n n are permitted to engage with the racks N farther forward. During the lowering of the brushes the vertical rods H H descend with the rear ends of the shafts G G, to which they are coupled, and which they help to support. If it be desired, now, to have the brushes throw less dirt than they would in the position in which they were previously set, the dogs n n are disengaged from the racks by means of the levers L L and connecting-rods m m, and the upper ends of the hand-levers K K are vibrated backwardly, when the lower ends of said levers K K, moving forwardly, will pull up the chains $g^4$ $g^4$ over the pulleys $g^5$ $g^5$ and draw up the rear ends of the shafts G G, thus elevating the rotary brushes or hoes secured thereon. When the brushes have been elevated to the desired height, the dogs n n are permitted to again drop into the notches in the racks N N. During the raising of the brushes of course the guide and supporting rods H H move upwardly with the inward vibrations of the rear ends of the shafts G G.

If it be desired to adjust the brushes laterally, the rods H H are moved either toward or away from the driving-wheels, which movement will of course carry with the rods the rear ends of the shafts G G, the forward ends of said shafts turning on the vertical pivots of the universal-joint couplings. It will be seen that by the lateral adjustment of the brushes they may be made to throw the dirt from lines nearer to or farther from the sides of the row, as may be desired, and that by the convergent arrangement of the drum-shafts the brushes are rendered capable of gathering up and throwing toward the row of plants a larger quantity of the dirt (with a given depth of cut) than would be possible were the brush-like drums arranged with their axes in line with the line of travel of the machine.

As has been heretofore stated, at the time of the first cultivation of the growing cane only about five to eight teeth in only two of the disks of each drum are used; but it will of course be understood that the principle of operation of the machine is substantially the same as when the full number of teeth and disks are used.

After the sugar-cane shall have been cultivated the required number of times, and shall have grown up to its full height, it may be cut, as usual, about the 1st of October, and my new machine may then be used for another purpose—viz., to fertilize the soil, by planting a crop of cow-peas among the cane-stubble, which is very desirable. Trenches having been cut with an ordinary plow on each side of the cane-stubble, cow-peas are scattered over the soil turned out by the plow, and then my machine is set to work about in the manner already explained—that is, it is set astride the cane-stubble, and, being drawn forward by the horses, the brushes are rotated so as to throw both dirt and cow-peas into both the trenches cut and the space occupied by the cane-stubble.

In the use of a cultivator thus employing revolving brush-like devices, it will be seen that there is no likelihood of any cutting of the cane-plant or other injury thereto, such as may occur in the use of plows or other implements of known forms, because the brushes or rotary cultivator-teeth may be set farther away from the plants, and at the same time roll, brush, or sweep over enough soil for the desired purposes.

Of course, although I have shown the cultivator-teeth of a particular form, and have made them detachable from the disks, it will be understood that I do not limit myself to either the use of any particular shape of cultivator-teeth or to the employment of teeth that are detachable from the machine; neither do I wish my invention to be considered as limited to revolving brushes made of any particular material, and although I prefer the teeth of such brushes to be made of steel bars, either bristles or bars of any other material may be used.

All matters herein shown and described, but not claimed, and claimed in an application filed by me December 4, 1884, No. 149,484, (of which this is a division,) is hereby disclaimed in favor of said other application, and in which I make claim to one or more toothed rotary drums, the direction of rotation of which is or are nearly or quite transverse to that of the main wheels of the machine, and which operate on the soil at a locality or localities more or less distant from that at which the row of growing stalks is planted, to both pulverize and brush or throw up the earth or soil toward and into the row of growing stalks, and in which I further make claim to the combination, with a suitable frame, ground-wheels, and driving mechanism, of a pair of rotary brush-like drums arranged to travel on either side of the row of plants to be cultivated, and means for vertically adjusting either or both of said brush-like drums.

Having now so fully explained my invention that those skilled in the art can make and use a machine embodying the same, what I claim in this application, and desire to secure by Letters-Patent, is—

1. The combination, with a suitable frame, ground-wheels, and driving mechanism, of a pair of rotary toothed drums for pulverizing and throwing up the soil, arranged to travel on each side of the row of plants being cultivated, and having their shafts or axes arranged convergently from the forward ends rearwardly, as and for the purposes set forth.

2. In a cultivator adapted to straddle a row of plants and throw up the soil on either side of the row, the combination, with the main frame-work and ground-wheels, of two poles or tongues, and a cross-bar or yoke-piece near the forward ends of said poles, and means for effecting the draft of the machine from the axle ends, substantially as set forth.

3. A rotary brush-like drum or cultivator device, composed, as specified, of a series of clamping-disks arranged on a shaft, and one or more sets of radially-arranged teeth or their equivalents loosely secured, as described, whereby each of said teeth is free to vibrate more or less in its bearings between the clamping-disks, as and for the purpose set forth.

4. The combination, with a suitable frame, ground-wheels, and driving mechanism, of a pair of rotatory soil-throwing drums, arranged to travel on each side of the row of plants and means for adjusting the axes of said drums both laterally and vertically, all substantially as and for the purposes hereinbefore set forth.

In testimony whereof I have hereunto set my hand this 25th day of March, 1885.

J. L. LAUGHLIN.

In presence of:
ALBERT CRUTCHER,
JOHN L. DODD.